United States Patent Office 3,218,351
Patented Nov. 16, 1965

3,218,351
N-NAPHTHENYL POLYAMINE SALTS
Samuel E. Jolly, Ridley Park, Pa., assignor to Sun Oil Company, Philadelphia, Pa., a corporation of New Jersey
No Drawing. Original application Nov. 15, 1956, Ser. No. 622,270. Divided and this application Feb. 1, 1960, Ser. No. 5,622
4 Claims. (Cl. 260—501)

This application is a division of application Serial No. 622,270, filed November 15, 1956, now abandoned, which itself is a continuation-in-part of application Serial No. 478,909, filed December 30, 1954, now abandoned.

This invention relates to new compositions of matter and to protection of metals from corrosion using the compositions as inhibitors.

The new compositions according to the invention constitute an improvement over prior art compositions as disclosed in United States Patent No. 2,736,658 issued February 28, 1956, to F. W. Pfohl and V. P. Gregory. These prior art compositions are N-substituted polyamines and salts thereof wherein the substituent is a hydrocarbon radical derived from fatty acids or rosin acids. The compositions according to the invention differ from those disclosed in the cited patent in that the substituent is a hydrocarbon radical derived from petroleum naphthenic acids.

It has been found that the compositions according to the invention have properties which differ markedly from the compositions of the cited patent. Thus, whereas the latter compositions are generally paste-like solids at room temperature, the compositions according to the invention are generally viscous liquids at room temperature. Also, the compositions according to the invention are superior corrosion inhibitors in that they provide excellent corrosion inhibition when used in amounts so small that the compositions of the cited patent are unsatisfactory.

The compositions according to the invention are: polyamines containing at least two nitrogen atoms separated by a polymethylene group containing 2 to 6 carbon atoms, one of the nitrogen atoms being connected to a hydrocarbon radical derived from petroleum naphthenic acids; salts of such polyamines; N-hydroxyalkyl and N-polyoxyalkylene derivatives of such polyamines and salts; and protective oil and grease compositions containing such polyamines, salts and derivatives.

Preferred polyamines according to the invention are those having the formula $RNH[(CH_2)_mNH]_nH$, where $m$ is an integer from 2 to 6, $n$ is an integer from 1 to 5, and R is selected from the group consisting of R' and R'CH$_2$ where R' is a hydrocarbon radical attached to a carboxyl group in petroleum naphthenic acids. Thus, petroleum naphthenic acids constitute a mixture of compounds having the formula R'COOH where the hydrocarbon radical varies from molecule to molecule both in molecular weight and structure; and similarly, the polyamines according to the invention are mixtures wherein the radical R, being derived from the corresponding radical in petroleum naphthenic acids, also varies from molecule to molecule.

In one embodiment of the invention, the radicals R and R' are the same. Such polyamines can be prepared by procedures involving, first, the conversion of petroleum naphthenic acids, R'COOH, to the corresponding amines R'NH$_2$ by known methods for such conversion. See Carleton Ellis, "Chemistry of Petroleum Derivatives," pages 1062 to 1091 (1934), and the references cited therein. The amines are then converted to polyamines by suitable procedure as discussed subsequently.

In another embodiment, the radical R contains an additional methylene radical. Such polyamines can be prepared by procedures involving, first, the conversion of petroleum naphthenic acids, R'COOH, to the corresponding amines R'CH$_2$NH$_2$ by known methods for such conversion. See the Ellis reference previously cited. The amines are then converted to polyamines by suitable procedure as discussed subsequently.

Preferred polyamines according to the invention are those wherein $m$ is 3 and $n$ is 1, i.e., N-naphthenyl trimethylene diamines. Such polyamines can be prepared for example by reacting naphthenyl amines, R'NH$_2$ or R'CH$_2$NH$_2$, with acrylonitrile to form N-cyanoethyl naphthenyl amines, and hydrogenating the latter to N-naphthenyl trimethylene diamines. Polyamines wherein $m$ is 3 and $n$ is 2 or more can be prepared by further cyanoethylation and hydrogenation. Thus, for example, the following reactions can be performed:

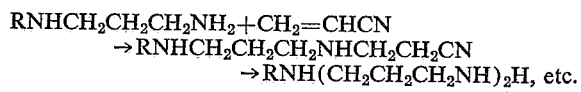

Polyamines wherein $m$ is 2 can be prepared for example by reacting naphthenyl amines, R'NH$_2$ or R'CH$_2$NH$_2$, with ethylene imine at 150° C. to 225° C. in the presence of a solvent such as xylene:

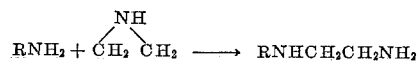

The reaction products can be further converted to polyamines wherein $m$ is 2 and $n$ is 2 or more by further reaction with ethylene imine.

Various salts having valuable properties can be prepared from the polyamines according to the invention. In one embodiment, the polyamines are neutralized or partially neutralized with carboxy-hydrocarbons having 2 to 30 carbon atoms, and preferably at least 16 carbon atoms, e.g., fatty acids, rosin acids, naphthenic acids, benzoic acid, naphthoic acid, cyclohexylacetic acid, acids produced by partial oxidation of acyclic, aromatic, or cycloaliphatic hydrocarbons or mixtures thereof, etc.

In another embodiment, the polyamines are reacted with hydroxy-substituted aromatic acids having 7 to 15 carbon atoms, such as salicylic acid, hydroxynaphthoic acids, hydroxy toluic acids, etc., salicylic acid being a preferred acid within this class.

In another embodiment, the polyamines are reacted with petroleum sulfonic acids of the well known mahogany or green acid type, the mahogany acids being preferred. Instead of mixtures of sulfonic acids, individual sulfonic acids such as dodecyl benzene sulfonic acid and other well known synthetic aromatic sulfonic acids can be employed. Aliphatic sulfonic acids as well known in the art can also be employed. The number of carbon atoms in the sulfonic acids is within the range from 6 to 30, preferably 12 to 24.

In another embodiment of the invention, the polyamines are reacted with amidocarboxylic acids containing 3 to 30 carbon atoms. Such acids are well known in the art and comprise sulfamido and carboxylic acid amido derivatives of aminoacids such as sarcosine, glycine, leucine, alanine, etc. Preferred amidocarboxylic acids for this embodiment are amido derivatives of aminoacids having the formula RNHR'COOH where R is hydrogen or an alkyl radical preferably having 1 to 5 carbon atoms and R' is an alkylene radical preferably having 1 to 5 carbon atoms, and amido derivatives of aminoacids having the formula NH$_2$(COOH)CHR where R is a hydrocarbon radical preferably having 1 to 5 carbon atoms. The amidocarboxylic acids can be prepared by known methods such as the preparation of sulfamidocarboxylic acids given in "Industrial and Engineering Chemistry," volume 41, pages 2616 to 2622 (1949), or by the known reaction of acid chlorides with alkali metal salts of aminoacids, etc. Preferably, the amidocarboxylic acids are amides of sulfonic or carboxylic acids having 2 to 30 carbon atoms. The hydrocarbon radical of the sufonic or carboxylic acid can be aliphatic, cycloaliphatic or aromatic, various examples of such acids being disclosed elsewhere in this specification.

In another embodiment the polyamines are reacted with 2-mercaptothiazol derivatives having 4 to 10 carbon atoms, e.g. 4-methyl-2-mercaptothiazol, 4,5-dimethyl-2-mercaptothiazol, 4-hexyl-2-mercaptothiazol, 2-mercaptobenzothiazol, etc.

Examples of polyamines and salts according to the invention are the following: N-naphthenyl ethylene diamines N-naphthenyl trimethylene diamines, N-naphthenyl tetramethylene diamines, N-naphthenyl hexamethylene diamines, N-naphthenyl diethylene triamines, N-naphthenyl tetramethylene pentamines, N-naphthenyl dipropylene triamines, N-naphthenyl derivatives of

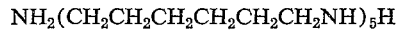

N - naphthenyl - N' - hydroxyethyl ethylene diamines, N-naphthenyl-N'-ethoxy-ethanol trimethylene diamines, N-naphthenyl-N,N'-di(hydroxyethyl)tetramethylene pentamines, N-naphthenyl-N'-hydroxypropyl ethylene diamines, etc., mono-, di-, or higher polysalts of such amines with petroleum naphthenic acids, resin acids, tall oil, fatty acids such as acetic, caprylic, lauric, palmitic, oleic, stearic acid, etc., salicylic acid, benzoic acid, petroleum sulfonic acids, 2-mercaptobenzothiazol, 4,5-dimethyl-2-mercaptothiazol, 4,4-dimethyl-2-mercaptothiazol, 5-methyl mercaptothiazol, hydrocarbon-substituted sulfamido-acetic acids where the hydrocarbon substituent has 12 to 24 carbon atoms, etc.

Any suitable naphthenic acids can be employed to make the polyamines according to the invention. Typical average numbers of carbon atoms per molecule in naphthenic acids are those within the approximate range from 12 to 30, and naphthenic acids having such numbers of carbon atoms are generally suitable for use according to the invention. However, the naphthenic acids having average numbers of carbon atoms per molecule of at least about 18 are preferred in that the polyamines prepared therefrom have superior characteristics in various uses including corrosion inhibiting.

Where naphthenic acid salts of the polyamines are prepared, the characteristics of the naphthenic acids reacted with the polyamines can be the same as or different from those of the naphthenic acids used to prepare the polyamines. Any suitable naphthenic acids can be used to react with the polyamines, though preferably the average number of carbon atoms is within the ranges specified in the preceding paragraph.

N-hydroxyalkyl and N-polyoxyalkylene derivatives of the polyamines previously specified are within the scope of the present invention. Such derivatives can be prepared in known manner by reaction of an alkylene oxide, e.g., ethylene oxide, propylene oxide, 1,2-epoxybutane, 1-methyl-2,3-epoxy butane, etc. with the polyamine. Both hydroxyalkyl and polyoxyalkylene groups can be present in the molecule. Preferably, the total number of carbon atoms per molecule in such groups is within the approximate range from 2 to 10.

The novel compositions according to the invention are useful for a variety of purposes, e.g., as corrosion inhibiting and detergent additives for petroleum fractions such as kerosene, lubricating oil, etc., as antisludging additives for petroleum fuels, as emulsifying agents, etc. They also may be useful as bactericidal or bacteriostatic agents. They are particularly useful for inhibiting corrosion of metal equipment used in production and transportation of oil well fluids, including gas well fluids and gas condensate well fluids, such corrosion being normally caused by materials such as $H_2S$, $CO_2$ and lower organic acids. The polyamines or salts can be commingled with the well fluids in any suitable manner, e.g., by introducing them, either alone or dissolved in a suitable solvent such as an aromatic hydrocarbon solvent, into the well tubing or into the annulus between the tubing and the casing. The inhibitor can alternatively be incorporated in a solid stick inhibitor containing microcrystalline wax or other suitable material. The injection practices which are known for use with other organic inhibitors are generally suitable for use with the present inhibitor. Preferably, the inhibitor is added to the corrosive well fluids in amounts of 10 to 1000 p.p.m. based on the well fluids, e.g., a mixture of crude oil and brine. In addition to their corrosion inhibiting properties, the salts have detergency characteristics which make them useful in maintaining metal surfaces of well production equipment in clean condition, and in removing corrosion products or scale from corroded metal surfaces.

The compositions are useful in other corrosion inhibition applications also, being generally useful in protecting ferrous metals from corrosion, the protection being accomplished by means of a layer of the inhibiting composition on the metal surface. In using the novel compositions according to the invention as corrosion inhibitors, they can be applied directly to the metal surface which is to be protected. Preferably, however, they are first dissolved in a protective hydrocarbon oil, and the solution applied to the surface. Suitable operation in the latter instance is disclosed for different inhibitors in United States Patent No. 2,736,658 previously cited, and similar operation can be employed in the present instance. Preferred amounts of the inhibitor in the oil are those within the approximate range from 0.01 to 1.0 weight percent, though any larger amount which is soluble in the oil can be employed. The inhibitors can also be employed in greases comprising gelled hydrocarbon oils as described in United States Patent No. 2,736,658 previously cited. Preferred amounts of the inhibitor in the grease are those within the approximate range from 1 to 5 weight percent, though any larger amount which is compatible with the grease can also be employed.

Petroleum naphthenic acids employed to make the polyamines according to the invention can be either naturally occurring petroleum naphthenic acids or naphthenic acids obtained by partial oxidation of petroleum napthene hydrocarbons. The latter acids can be prepared for example by liquid phase partial oxidation of petroleum fractions containing substantial amounts, e.g., at least 20 weight percent, and preferably at least a major proportion, of hydrocarbons containing at least one naphthene ring. Preferred oxidation temperatures are those from 150° F. to 400° F., more preferably 200° F. to 300° F. Preferred oxidation pressures are those from atmospheric pressure to 500 p.s.i.g. Oxidizing agents comprising gaseous oxygen are preferred, e.g. oxygen itself, air, ozonized air, etc., though the well known chemical oxidizing agents such as hydrogen peroxide can also be employed. Preferably, an oxidation catalyst of the well known drier type, e.g., manganese naphthenate, is employed. Partial oxidation by similar procedures of naphthenic, aromatic or acyclic hydrocarbons can be employed to prepare carboxylic acids for use in making neutralization products of the polyamines according to the invention.

The following examples illustrate the invention:

*Example I*

Naphthenyl amines were reacted with acrylonitrile to produce N-cyanoethyl naphthenyl amines, and the latter were hydrogenated to produce N-aminopropyl naphthenyl amines having the formula $RCH_2NHCH_2CH_2CH_2NH_2$ where R is a hydrocarbon radical previously attached to a carboxyl group in petroleum naphthenic acids.

The naphthenyl amines had been previously prepared from petroleum naphthenic acids sold commercially under the trademark, "Sunaptic Acids B." Typical properties for these acids are the following: acid number 159 mg. of KOH per gram, refractive index at 20° C., 1.503; average molecular formula $C_{21}H_{37}O_2$, and distillation range at 2 mm. of Hg, 287° F. to 530° F. (98%).

The reactions involved in the preparation of the N-aminopropyl naphthenyl amines are as follows:

(1) $RCOOH + NH_3 \rightarrow RCOONH_4$
(2) $RCOONH_4 \rightarrow RCN + 2H_2O$
(3) $RCN + 2H_2 \rightarrow RCH_2NH_2$
(4) $RCH_2NH_2 + CH_2=CHCN \rightarrow RCH_2NHCH_2CH_2CN$
(5) $RCH_2NHCH_2CH_2CN + 2H_2$
$\rightarrow RCH_2NHCH_2CH_2CH_2NH_2$ Since petroleum naphthenic acids are a mixture of acids wherein R varies in structure and molecular weight from one molecule to another, the N-aminopropyl naphthenyl amines or N-naphthenyl trimethylene diamines produced in step (5) are a mixture of diamines wherein also R varies in structure and molecular weight from one molecule to another.

Steps (1) and (2) of the preparation were carried out simultaneously by heating the naphthenic acids to about 300° C. while passing anhydrous ammonia therethrough, the contacting with ammonia at 300° C. being continued until the evolution of water substantially ceased. The product was vacuum distilled to obtain a mixture of nitriles as distillate product.

Step (3) was carried out by admixing 200 grams of sodium with 500 cc. of toluene, heating to melt the sodium, cooling with stirring until the sodium solidified in fine particles, and adding slowly to the mixture with stirring one mole of the nitriles produced in step (2) dissolved in 500 cc. of n-butanol; the heat evolved caused boiling, and the reaction mixture was maintained under reflux conditions; 900 cc. of additional n-butanol were added slowly, and the reaction mixture refluxed for 4 hours; more toluene was added from time to time to maintain a suitably low viscosity. At the end of the 4 hours, water was added to decompose the alcoholates and any unreacted sodium. The reaction products were then washed with water to remove sodium hydroxide. Alcohol and toluene were stripped from the naphthenyl amines. The latter were converted to acetates which were dissolved in 50% aqueous isopropanol and washed with naphtha to remove unreacted nitriles. The amines were liberated from the acetates by adding caustic soda and distilled to obtain a naphthenyl amine distillate having properties as described in the following paragraph.

In step (4) of the preparation, 180 grams of naphthenyl amines having HCl equivalent of 104 mg. of HCl per gram and calculated molecular weight of 351 and containing 3.27 weight percent of nitrogen were admixed with 106 grams of acrylonitrile, 52.8 grams of acetic acid and 198 grams of water. The mixture was refluxed at 80 to 90° C. for 29 hours. The products were cooled to room temperature, made slightly alkaline with caustic soda, and contacted with benzene to extract the cyanoethylated product. The benzene layer was washed with water and then distilled to strip out benzene.

In step (5), the hydrogenation was performed by the sodium-butanol technique: 50 grams of metallic sodium were suspended in 200 cc. of toluene. 90 grams of the cyanoethylated product of step (4) were dissolved in 125 cc. of n-butanol and 200 cc. of toluene. The resulting solution was added gradually to the solution of sodium in toluene. 430 cc. of additional n-butanol were then added while maintaining reflux conditions. The reaction mixture was refluxed for 5 more hours with mechanical stirring. Water was then added to the reaction mixture to decompose excess metallic sodium. Benzene was added to extract the polyamine reaction product. The benzene solution was washed with water, and then distilled to strip out benzene. The product was further purified by converting to the acetate which was dissolved in 50% aqueous isopropanol and the solution washed with naphtha. The alcohol solution was then contacted with aqueous caustic soda to liberate diamines from the acetate salt. The diamines were washed with water to remove caustic soda. 73 grams of N-naphthenyl trimethylene diamines were recovered. The properties of the diamine mixture were as follows: HCl equivalent 164, $d_4^{20}$ 0.9434, Saybolt Universal viscosity at 100° F. 2380 seconds, at 210° F. 253 seconds, $n_D^{20}$ 1.5033, nitrogen content 5.86 weight percent, calculated molecular weight 445. The mixture of diamines was a reddish brown, very viscous, tacky liquid at room temperature.

*Example II*

A mixture of N-naphthenyl trimethylene diamine dinaphthenates was prepared. The N-naphthenyl trimethylene diamine product of Example I was admixed at about 150° F. with "Sunaptic Acids B" as previously specified, with stirring for about 5 minutes. The mole ratio of diamines to naphthenic acids was 1:2. The salts produced were a homogenous, black, very viscous, tacky liquid comprising constituents having the formula

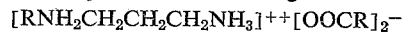

$[RNH_2CH_2CH_2CH_2NH_3]^{++}[OOCR]_2^-$

*Example III*

The mixture of salts produced in Example II was tested as a corrosion inhibitor for oil well fluids according to the following procedure: Approximately equal volumes of a severely corrosive kerosene saturated with hydrogen sulfide, and of brine containing 13.24 grams per liter of $CaCl_2 \cdot 2H_2O$, 3.5 g./l. of $Na_2SO_4$, 60 g./l. of NaCl, 10.68 g./l. of $MgCl_2 \cdot 6H_2O$, 1.0 g./l. of $Na_2CO_3$, and 400–600 p.p.m. of $H_2S$ were placed in a bottle, together with amounts of the polyamine salt mixture as indicated in the table below, expressed as parts per million based on the sum of the volumes of oil and brine. A cleaned and weighed ⅛″ rod of mild steel was placed in the bottle, and the latter was sealed. The liquids nearly filled the bottle, the remaining fluid being largely air. The bottle was placed on the periphery of a drum which was rotated at a rate of about 100 revolutions per minute for a period of 24 hours. The test was carried out at room temperature. The steel rod was then removed, electrolytically cleaned, and weighed to determine the weight loss from corrosion by the oil and brine. This weight loss was compared with that obtained in a blank run with no inhibitor, and the percent reduction in weight loss by use of the inhibitor determined. The corrosive material used in this test gives results which correlate satisfactorily with results obtained using actual well fluids comprising crude oil saturated with $H_2S$ and brine saturated with $H_2S$ and $CO_2$.

For comparison, a mixture of N-tallow trimethylene diamine dinaphthenates was tested according to the same procedure. This material was the same as the N-naphthenyl trimethylene diamine dinaphthenates except that the diamine part of the molecule was prepared from tallow fatty acids rather than "Sunaptic Acids B."

The results of the tests indicated that the naphthenyl diamine dinaphthenates according to the invention are somewhat superior to the tallow diamine dinaphthenates when used in concentrations of 25 p.p.m. or more based on corrosive liquid, and are also highly effective in 15 p.p.m. concentration, whereas the tallow diamine nathenates give poor results at 15 p.p.m.:

| P.p.m. | Percent Protection | |
|---|---|---|
|  | Tallow Diamine Salts | Naphthenyl Diamine Salts |
| 15 | 20 | 80 |

Thus, the presence of a naphthenyl, rather than fatty, radical, in the diamine results in unpredictably superior corrosion inhibiting properties.

N-naphthenyl trimethylene diamine monoaphthenates produced as in Example II except that the molar ratio of diamines to naphthenic acids is 1:1, have similar appearance to the salts of Example II, and are also effective corrosion inhibitors.

*Example IV*

A mixture of N-naphthenyl trimethylene diamine salts of mercaptobenzothiazol was prepared and tested as a well corrosion inhibitor. Mono salts (molar ratio of thiazol to diamines 1:1) and di salts (molar ratio of thiazol to diamines 2:1) were prepared, by procedure similar to that in the preceding examples. In both cases, the mixture of salts was a dark reddish brown, very viscous, tacky liquid. In both cases, effective corrosion inhibition was obtained, the mono salt providing 63 percent protection at concentrations as low as 15 p.p.m.

*Example V*

Mono and di salts of N-naphthenyl trimethylene diamine and salicylic acid were prepared by procedure similar to that in the preceding examples. The mixtures were in both cases similar in properties to that of the mercaptobenzothiazol salts of Example IV except that the salicylates were a lighter reddish brown color. Both mixtures were effective in the well corrosion test, the mono salt providing 79 percent protection at concentrations as low as 15 p.p.m.

*Example VI*

Mono and di salts of N-naphthenyl trimethylene diamine and benzoic acid were prepared by procedure similar to that in the preceding examples. The mixtures were in both cases similar in properties to the salicylic acid salts of Example V. Both mixtures were effective in the well corrosion test.

*Example VII*

Mono and di salts fo N-naphthenyl ethylene diamines and dodecyl benzene sulfonic acid are prepared and tested in a similar manner to that previously described, with generally similar results.

*Example VIII*

Mono and di salts of N-naphthenyl diethylene triamines and a mixture of compounds having the formula $RSO_2NHCH_2COOH$ where R is an aliphatic hydrocarbon radical varying from 12 to 18 carbon atoms per molecule are prepared and tested in a similar manner to that previously described, with generally similar results.

*Example IX*

Mono and di salts of N-naphthenyl trimethylene diamine with the lauric acid amide of sarcosine, and mono and di salts of that diamine with the stearic acid amide of leucine are prepared and tested in a similar manner to that previously described, with generally similar results.

Generally similar results are obtained using other polyamines such as N-naphthenyl tetraethylene pentamine, N-naphthenyl-N'-hydroxyethyl trimethylene diamine, N-naphthenyl - N'-triethoxyethanol ethylene diamine, N-naphthenyl derivatives of $$NH_2(CH_2CH_2CH_2CH_2CH_2CH_2NH)_5H,$$

etc., or salts thereof with various materials such as oleic acid, rosin acids, tall oil, mahogany sulfonic acid, 4-methyl-2-mercaptothiazol, etc.

In place of the salts employed in the preceding examples, the unneutralized polyamines can be employed, with beneficial results accruing from the presence of naphthenyl radicals in the polyamines rather than other hydrocarbon radicals. However, for corrosion inhibition, the previously specified salts provide generally superior results to those obtained with the unneutralized polyamines, and such salts are therefore preferred.

Generally, the invention contemplates the specified naphthenyl polyamines and their salts, either with organic or inorganic acids, e.g., phosphoric acid, hydrochloric acid, sulfuric acid, phenylacetic acid, picric acid, thiocyanic acid, nicotinic acid, oxalic acid, maleic acid and other acids as previously specified.

The invention claimed is:

1. As new compositions of matter, salts of carboxylic acids having 2 to 30 carbon atoms with a naphthenyl polyamine composition having the formula $$RNH[(CH_2)_mNH]_nH$$

where $m$ is an integer from 2 to 6, $n$ is an integer from 1 to 5, and R is selected from the group consisting of R' and R'CH$_2$ where R' is a hydrocarbon radical attached to a carboxyl group in petroleum naphthenic acids.

2. Composition according to claim 1 wherein the first-named carboxylic acids are the petroleum naphthenic acids.

3. Composition according to claim 1 wherein the first-named carboxylic acid is salicylic acid.

4. Composition according to claim 1 wherein the first-named carboxylic acid is benzoic acid.

References Cited by the Examiner

UNITED STATES PATENTS

| | | | |
|---|---|---|---|
| 2,024,606 | 12/1935 | Sebrell | 260—306.6 |
| 2,736,658 | 2/1956 | Pfohl | 260—501 |
| 2,818,383 | 12/1957 | Jolly | 252—8.55 |
| 2,828,259 | 3/1958 | Wirtel et al. | 252—8.55 |
| 2,879,200 | 3/1959 | Kosmin | 260—306.6 |
| 2,894,987 | 7/1959 | Stein | 260—563 |
| 2,900,411 | 8/1959 | Harwood et al. | 260—501 |
| 2,914,557 | 11/1959 | Oxford | 260—501 |
| 2,920,040 | 1/1960 | Jolly | 252—8.55 |
| 2,995,603 | 8/1961 | Hutchison | 260—501 |
| 3,025,240 | 3/1962 | Sheldahl | 260—501 |

OTHER REFERENCES

Heilbron, Dict. of Org. Compds. (Oxford), vol. III, p. 555 (1953).

Lochte et al., The Petroleum Acids and Bases, 1955 (pages 247, 258 relied upon).

Pearson et al., J. Am. Chem. Soc., vol. 68, pp. 1226–7 (1946).

LORRAINE A. WEINBERGER, *Primary Examiner.*

IRVING MARCUS, HERBERT J. LIDOFF, LEON ZITVER, *Examiners.*